June 2, 1970   M. L. HOGGARTH   3,514,868
APPARATUS FOR THE DISTRIBUTION OF GAS IN A VESSEL
Filed Jan. 21, 1969
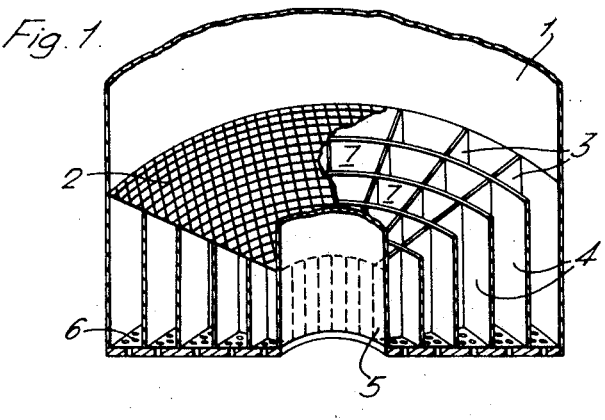
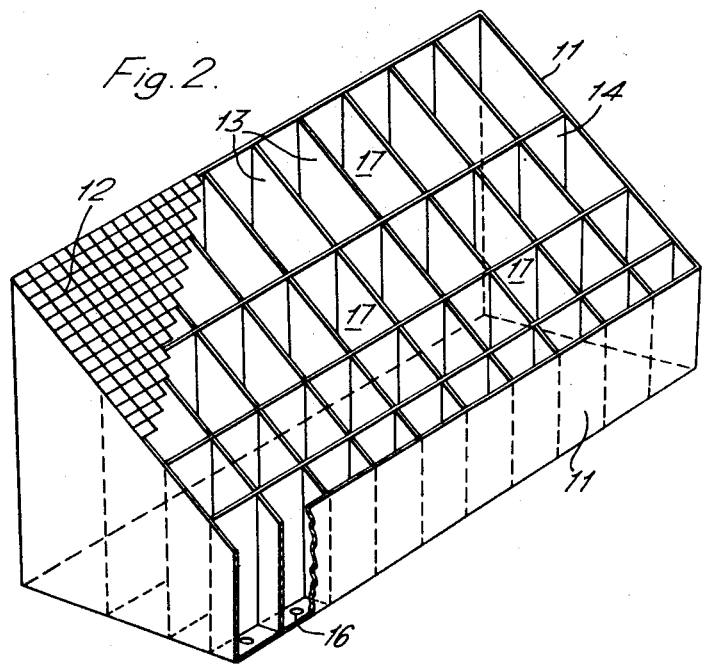

3,514,868
APPARATUS FOR THE DISTRIBUTION
OF GAS IN A VESSEL
Malcolm Leslie Hoggarth, Solihull, England, assignor to
The Gas Council, London, England, a British body
corporate
Filed Jan. 21, 1969, Ser. No. 792,660
Claims priority, application Great Britain, Jan. 31, 1968,
4,958/68
Int. Cl. F26b 17/14
U.S. Cl. 34—57     3 Claims

ABSTRACT OF THE DISCLOSURE

Apparatus, for providing a uniform distribution of gas in a vessel having a sloping or undulating floor used to support a fluidised bed, wherein the floor is supported on a plurality of gas conduits of varying length, each conduit containing a bed of particulate material and being arranged such that the ratio between the cross-sectional area of a conduit and the mean height of the walls forming that conduit remains constant across the floor assembly.

BACKGROUND OF THE INVENTION

This invention relates to apparatus for the distribution of gas flow in a vessel and is particularly but not exclusively concerned with vessels used to contain a fluidised bed. One such vessel is described in our British Pat. No. 1,036,890.

The British patent describes apparatus whereby gas flowing into a vessel, having a cross-sectional area appreciably larger than the gas inlet conduit, is distributed uniformly over substantially the whole cross-sectional area of the vessel. In this manner channeling of a particulate material forming the bed is avoided with consequent increase in the efficiency of fluidisation and gas utilisation. However, it is often desirable to provide a fluidised bed-containing vessel having a sloping or undulating floor such that the fluidised material can move gradually from one side of the bed to the other to be withdrawn or to promote circulation of the material within the bed. Under such circumstances difficulties can arise in maintaining a uniform distribution of gas throughout the cross-section of the bed and it is an object of the present invention to provide gas distribution means whereby the said difficulties are minimised.

SUMMARY OF THE INVENTION

According to the invention apparatus for the distribution of a gas in a vessel having a sloping or undulating floor comprises a plurality of conduits arranged to form an assembly mountable within a vessel across the direction of flow of the gas, the conduits being substantially parallel to the direction of said flow, each conduit having a closed end provided with at least one orifice and an open end which, when the assembly is mounted within the vessel, is situated downstream of the closed end with respect to the said flow, each conduit containing a bed of particulate material, and being defined by the intersection of a plurality of wall elements, said elements extending in a direction parallel to the said flow and being spaced such that the ratio between the cross-sectional area of each conduit and the mean height of the wall elements defining that conduit, remains constant across the assembly.

Preferably, the open ends of the conduits form supporting means for a damper plate which extends across the assembly providing a floor to the vessel, said plate comprising an apertured sheet, the apertures being dimensioned such that the gas flow from each conduit is substantially unrestricted.

According to one aspect of the invention the floor is frustoconical in form and supported on a plurality of radial and concentric wall elements, the position of the said wall elements determining the cross-sectional area of each conduit and the height and radial spacing of the concentric wall elements controlling the slope of the floor.

BRIEF DESCRIPTION OF THE DRAWING

To enable the nature of the invention to be more readily understood, embodiments of the invention will now be described, solely by way of example, with reference to the accompanying drawing. In the drawing:

FIG. 1 is a diagrammatic view of a gas distribution arrangement for an annular bed and FIG. 2 shows a similar arrangement for a rectangular bed.

DESCRIPTION OF THE PREFERRED EMBODIMENT

Referring specially to FIG. 1 a vessel 1 arranged to contain a bed of particulate material is cylindrical and provided with an annular distribution floor 2 of inverted frustoconical form. The floor of mesh or apertured sheet material is supported on a plurality of vertical wall elements 3 and 4, the elements 3 being arranged to radiate from a central duct 5 and the elements 4 being located concentrically around the duct 5. The wall elements are supported on an apertured grid plate 6 and are arranged to increase in height in relation to their distance from the central axis of the vessel thus providing a support structure for the sloping floor. It will be appreciated that the compartments formed by the intersection of the radial and concentric wall elements act as gas conduits 7 and will vary in cross-sectional area in accordance with the number and spacing of the said wall elements. Since the ratio of cross-sectional area to height remains constant across the floor, the inner conduits are shorter than the outer ones and in consequence, the angle of slope of the floor can be defined by the rate of change of conduit cross-sectional area from the inner to the outer edge of the distributor floor.

By ensuring that the grid plate 6 is provided with a uniform number of apertures for unit area, the gas flow through each compartment or conduit can be suitably regulated since the larger conduits on the outer edge of the floor will be fed by a larger number of apertures than the inner conduits. Alternatively, the grid plate can be divided into the desired number of conduits and the number and position of the apertures calculated such as to provide the desired gas flow in each conduit. As previously described in the British patent, each conduit is filled with a bed of particulate material, for example, silica chippings such that gas flowing into the conduit through the grid plate is diffused to fill the entire conduit and desirably the height to equivalent diameter ratio of each conduit should equal or exceed four. The equivalent diameter $D$ of a conduit may be defined as $D=4S/b$ where $S$=cross-sectional area and $b$=the perimeter of the conduit.

It will be apparent that the invention is not restricted to vessels of circular or annular cross-section and FIG. 2 illustrates one form of sloping floor as applied to a rectangular vessel. In this instance the vessel 11 is provided with a gas distribution system which includes an apertured grid plate 16, a plurality of vertical wall elements 13 and 14 arranged to form rectangular gas conduits 17 between the grid plate and a sloping open mesh type floor 12.

The wall elements 13 are equally spaced and increase in height between the front and back of the vessel whereas each of the wall elements 14 is of uniform height throughout its length and extends between the end walls of the vessel. The spacing between the height of each wall element 14 may be arranged to suit the slope required.

By selection of suitable wall spacing it is possible to produce a distributor floor having a straight curved or undulating profile.

I claim:

1. Apparatus for the distribution of a gas in a vessel having a sloping or undulating floor comprising a plurality of conduits arranged to form an assembly mountable within a vessel across the direction of flow of the gas, the conduits being substantially parallel to the direction of said flow, each conduit having a closed end provided with at least one orifice and an open end which, when the assembly is mounted within the vessel, is situated downstream of the closed end with respect to the said flow, each conduit containing a bed of particulate material, and being defined by the intersection of a plurality of wall elements, said elements extending in a direction parallel to the said flow and being spaced such that the ratio between the cross-sectional area of each conduit and the mean height of the wall elements defining that conduit, remains constant across the assembly.

2. Apparatus according to claim 1 wherein the open ends of the conduits form supporting means for a damper plate which extends across the assembly providing a floor to the vessel, said plate comprising an apertured sheet, the apertures being dimensioned such that the gas flow from each conduit is substantially unrestricted.

3. Apparatus according to claim 2 wherein the floor is frustoconical in form and supported on a plurality of radial and concentric wall elements, the position of the said wall elements determining the cross-sectional area of each conduit and the height and radial spacing of the concentric wall elements controlling the slope of the floor.

References Cited
UNITED STATES PATENTS 2,934,411   4/1960   Purse.
3,354,933   11/1967  Wengeler.
3,417,978   12/1968  Suzukawa et al.

FREDERICK L. MATTESON, JR., Primary Examiner

R. A. DUA, Assistant Examiner

U.S. Cl. X.R.

239—556